March 20, 1956 N. D. NEWBY 2,739,183

MAGNETIC SCANNING ARRANGEMENT PROVIDING COMPENSATION FOR BATTERY VARIATION AND VARIATION OF OTHER COMPONENTS

Filed April 15, 1952 2 Sheets-Sheet 1

INVENTOR
N. D. NEWBY
BY William F. Simpson
ATTORNEY

INVENTOR
N. D. NEWBY
BY William F. Simpson
ATTORNEY

United States Patent Office 2,739,183

Patented Mar. 20, 1956

2,739,183

MAGNETIC SCANNING ARRANGEMENT PROVIDING COMPENSATION FOR BATTERY VARIATION AND VARIATION OF OTHER COMPONENTS

Neal D. Newby, Leonia, N. J., assignor to Bell Telephone Laboratories, Incorporated, New York, N. Y., a corporation of New York Application April 15, 1952, Serial No. 282,374

19 Claims. (Cl. 179—16)

This invention relates to electrical call receiving methods, circuits, devices and apparatus and to improvements therein. More particularly, this invention pertains to improvements in time division scanning methods, circuits and apparatus for successively and repeatedly scanning or testing a plurality of lines or conductors for calling signals.

An object of this invention is to provide improved methods, circuits and apparatus for compensating for both mechanical and electrical variations in electrical scanning systems. One type of such a system is disclosed in my copending application Serial No. 185,929, filed September 21, 1950.

In accordance with the present invention, means are provided for readily altering the operating limits of the system and for compensating for changes in leakage resistance of the calling lines, for compensating for changes in battery voltage, for compensating for changes in amplifier gain and tube variations, and for compensating for mechanical irregularities and eccentricities of a mechanically moving scanning member.

In accordance with one exemplary embodiment of this invention, means are provided for varying the gain, bias, or threshold of one or more amplifier stages to control the potential condition of the line distinguishing between a closed line and an open leaky line.

In accordance with another specific embodiment of this invention, means are provided for changing the gain of an amplifier in accordance with changing operating conditions.

In accordance with the present invention, one or more test segments of an electrostatic commutator or scanner have applied to them a predetermined voltage condition which may be a fraction of the operating line battery voltage and then control circuits respond to the voltage induced in a scanning element as it passes adjacent these said one or more test segments. The control circuits change either the bias of an amplifier or its gain so as to either just recognize or just fail to recognize this voltage condition as either an open line or a closed line.

A feature of the invention relates to circuits and apparatus for changing either the gain or bias of the amplifier in discrete steps.

Another feature of this invention relates to changing the gain or bias of an amplifier continuously.

Another feature of this invention relates to the use of compensating circuits, methods and apparatus for successively scanning each of a plurality of signaling lines or conductors repeatedly and in rotation in combination with storing means for storing the scanned information from each line in a particular group of storing instrumentalities individual to each of the signaling lines or conductors.

The foregoing and other objects and features of this invention may be more readily understood from the following description of an exemplary embodiment thereof when read with reference to the attached drawing in which.

Figure 1:
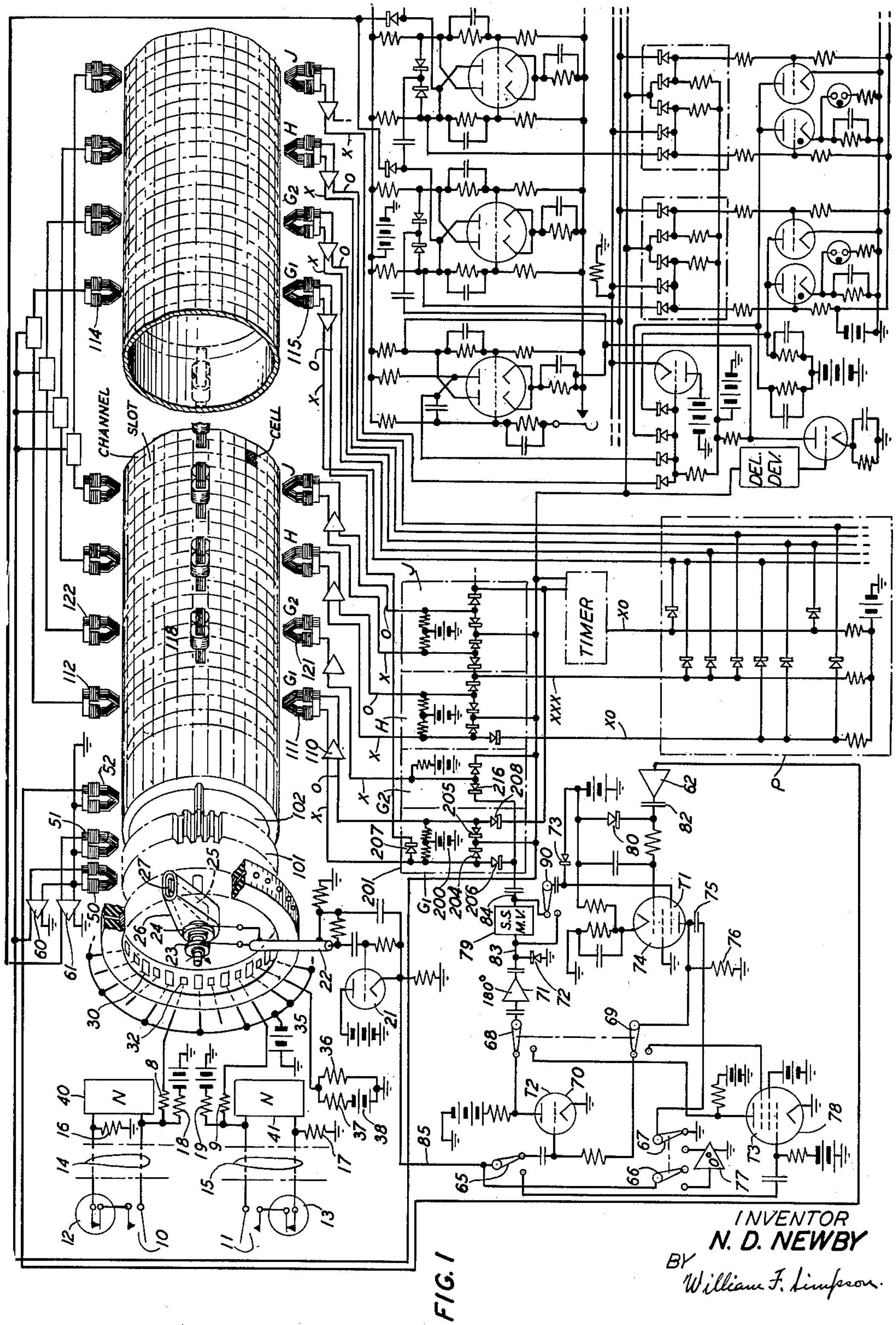
Fig. 1 shows an exemplary embodiment of the invention.

Fig. 1 shows an exemplary embodiment of the invention employed in combination with an electrostatic scanner of a type suitable for use in combination with the magnetic drum for recording calling signals such as encountered in telephone switching systems and other calling arrangements. As shown, the scanner is mounted on the same shaft as a rotating magnetic drum. However, when desired this scanning mechanism may be driven from some other shaft which may be geared to the magnetic drum driving means or otherwise synchronized with the drum driving means.

The scanning device, as shown in the upper left-hand portion of Fig. 1, comprises a rotating conductive arm 25 insulatively mounted on shaft 100 which is the same shaft employed to rotate drum 104. The end 27 of the rotating arm 25 passes adjacent to but does not touch or make contact with a plurality of segments 32, 33, etc. This arm in approaching each segment forms a condenser with the segment and has a voltage or current induced on or in it in accordance with the voltage of the segment. The rotating arm 25 is surrounded by a shield 26 which rotates with arm 25 but is insulatively supported therefrom. The rotating element 25 is likewise insulatively supported from the shaft. A pair of stationary rings 23 and 24 are provided. The ring 23 is electrostatically coupled to the rotating member 25 of the scanning or distributing mechanism and stationary ring 24 is capacitatively coupled to the shielding member 26. As shown in the drawings the capacitative elements 23 and 24 are in the form of rings placed in close proximity to the respective rotating elements of the distributor or scanning mechanism with which they cooperate to form an electric circuit. It is to be understood, of course, that any suitable form of electrostatic capacitative coupling may be employed or that any other suitable type of coupling may be employed including brushes resting on slip rings. However, the capacitative coupling is employed in the present embodiment of this invention because it is particularly well adapted for coupling to the rotating elements which in turn are capacitatively coupled to the segments 32, 33, etc., because this form of coupling introduces substantially no extraneous signals, noise currents or other interfering or stray currents, which currents would interfere with the low level signals picked up by the rotating member 25 as will be described hereinafter. In order to prevent excessive voltage drop across this coupling capacity, it is desirable that its capacity be large compared to the capacity between the rotating arm 25 and the segments which it passes.

The segments 32, 33, etc., of the distributor are separated by shielding segments 30 which are connected to ground or battery as shown in the drawing. These segments are provided to prevent interference between the various adjacent segments assigned to the individual lines as will be described hereinafter and also to improve the response or output obtained from the rotating arm 25.

The shielded member 26 is provided together with the shielded cable from the stationary rings 23 and 24 to prevent stray voltages induced from other sources from interfering with signals picked up by the rotating arm 25.

In an exemplary embodiment of the invention the recorder consists of a magnetic drum, the magnetic surface of which is provided with sufficient area to be employed in common by 1000 subscribers' lines, each line having reserved for its use an arc of about .36 degree. The line electrodes of the capacitative scanner for such an exemplary embodiment may be arranged on a flat plate perpendicular to the shaft or they may be arranged on the inner surface of a ring as shown on the drawing, the line electrodes also being spaced .36 degree. The scanning electrode 25 is mounted on the shaft of the drum and its associated amplifiers 21, 70, 71, and 79 are employed to amplify the received signals sufficiently to actuate the magnetic recording equipment.

As the scanning electrode 25 passes each line electrode such as 32, 33, etc., the electrical condition of the line may be recorded in the space on the magnetic drum reserved for it.

The sampling rate, that is, the speed of rotation of the scanning electrode must be sufficiently high to recognize the significant characteristics of the pulses or other received signals which are to be recorded. Assuming that the signals received are in the form of dial pulses, then the speed of rotation of the magnetic drum and also the scanning electrode 25 must be such that this electrode makes one complete revolution for each open interval of the dial and another complete revolution for each closed interval of the dial. When desired, the scanning electrode may make more than one revolution during each of these intervals and the system will operate the same as described hereinafter.

Inasmuch as the scanner rotates at a relatively high speed and inasmuch as the segments 32, 33, etc., are of relatively small dimensions measured in degrees of arc, the scanning circuit together with its amplifier and other related equipment must be designed to respond to pulses of relatively short duration and therefore must be arranged and designed to respond to high frequency currents. If the calling or subscribers' lines are subject to these high frequency currents, it will be desirable and sometimes necessary to provide suitable filtering elements between the line circuit and the electrostatic scanner.

As shown in the drawing, each line segment individual to a calling line is connected through a decoupling resistor 8, 9, etc., to a resistor 18, 19, etc., through which the line current of that line flows. Consequently, the voltage drop across this resistor 18, 19, etc., is the voltage applied to the capacitative scanner elements and this voltage causes the signals to be induced in the rotating element 25 as will be described hereinafter.

Another element of the present recording mechanism comprises a magnetic storage device. In the exemplary embodiment of this invention set forth herein the magnetic material employed for recording and storing signals comprises a layer upon a rotating drum. However, any suitably moving layer or surface of magnetic material such as a disc, belt, etc., which moves in a closed or reentrant path may be employed equally well in combination with the circuits and other apparatus embodying this invention.

The drum employed in the exemplary embodiment set forth herein in detail may be constructed of suitable structural material as, for example, brass, bronze tubing, stainless steel tubing, aluminum tubing, iron or steel tubing or any other suitable type of structural material including plastic materials and other insulating materials, the purpose of the structural material being to provide a cylindrical surface which may be rotated about its axis by driving means of suitable type such as an electric motor. The drum may be driven directly or by means of gears, belts or any other form of mechanical connection, and the motors energized from a suitable source of power, including batteries or other means. The speed of the motor is not critical and need not be maintained in synchronism with any other apparatus, so long as it rotates the shaft 100 and thus the drum 104 and the capacitative collector or distributor or scanning element 25 at the same speed and in synchronism with each other and sufficiently fast to provide one sampling interval for each line during each of the shortest signaling conditions on the line which it is desired to recognize.

The surface of the drum is accurately true running and is provided with a layer of magnetic material which in an exemplary embodiment employing metallic drums may take the form of an electroplated coating of magnetic material, such as a nickel-cobalt alloy or the like which has a thickness in the range of approximately .0003 inch to approximately .0006 inch.

A plurality of recording and pick-up coils comprising one or more windings on a ferromagnetic core structure are mounted in close proximity to the plated surface but not in contact with it. It will be convenient hereafter to speak of the recording process as "writing." The signals to be "written" or "recorded" are of a pulse-like character and have one or the other of two different values or characteristics, one being called X signals and the other O signals. The recording coils and the pick-up coils comprise a core structure having pole tips brought close together and placed in close proximity to the magnetic surface of the drum. Coils are wound on each of these cores and when employed for recording or writing the coil is employed to produce a magnetic flux across the pole tips which alters the magnetic condition of the surface of the drum. In the pick-up coils the magnetic condition of the drum induces a flux change between the pole-pieces and thus within the core structure of the pick-up coil. Consequently, a winding surrounding these cores has a voltage induced in it in accordance with the magnetic condition of the drum.

The circumferential area of the drum which passes immediately beneath the pole tips of a given coil or head is defined as a "channel" and that part of the channel which is directly under or immediately adjacent to pole tips of a given coil when a pulse of recording or writing current is applied to the coil is known as a cell or elemental area of the channel and is assigned to a given line. In the case of a multiplicity of recording coils or writing heads and a multiplicity of pick-up coils or reading heads, the aggregate of the elemental areas or cells which are under the several coils at any one instant of time is defined as a "slot" and is assigned to a given line. The group of cells or elemental areas assigned to a calling line pass under the respective coils at substantially the instant of time that the scanning electrode 25 is passing over the segment of the electrostatic distributor assigned to the same line. The simplest arrangement of such a slot is a rectangular area running parallel with the axis on the surface of the drum. It is to be understood, however, that in the usual case this slot will be more of a complicated form and is not therefore limited to such a rectangular area. When the various pick-up coils or recording coils or heads are staggered or arranged in the form of a spiral or helix around the drum the slot may be helical or may have a saw-tooth form or other discontinuous shape depending upon the location of the various recording and pick-up coils.

A recording amplifier is provided for each recording coil and is provided with two input leads designated X and O. These amplifiers are normally biased so that substantially no current flows in the recording coil windings. When it is desired to record an X signal a high positive voltage with respect to ground is applied to the X input lead and when it is desired to record an O signal a high positive voltage with respect to ground is applied to the O input lead.

A pick-up or reading amplifier is also provided for each pick-up coil. The pick-up or reading amplifiers have two output leads or terminals, one designated X and the other O. In the exemplary embodiment of this invention described in detail herein, when O signals pass under the pole-pieces of the pick-up coil connected to the respective amplifiers, a low positive voltage is applied to the X output leads or terminals and a high positive voltage is applied to the O output terminals. When an X signal passes under the pole tips of a pick-up coil, a high positive voltage is applied to the X output terminal of the pick-up amplifier individual to said coil and a low positive voltage is applied to the O output terminal by the respective pick-up amplifier.

In addition to the pick-up and recording coils located adjacent the magnetic drum described above, additional pick-up coils such as 50 and 51 are provided for generating timing and synchronizing pulses. As shown in the drawing these coils are located adjacent the periphery of the timing wheel 101 which is shown to be in the form of a gear whel. Coil 50 is adjacent the wheel having a plurality of substantially uniform spaced teeth or poles while coil 51 is adjacent the timing wheel 102 having a single gear tooth or pole. Each of the teeth or poles of the wheel adjacent coil 50 generates a pulse which is employed to control the recording of signals in the drum as will be described hereinafter. During each revolution a single pulse is generated in coil 51 which is used to restore numerous circuits to their initial condition so these circuits may start from a given initial condition once during each revolution. Consequently, errors in the circuits will not be additive for more than one revolution of the drum. While special coils 50 and 51 are shown adjacent the gear or tooth wheels for generating timing purposes, it is also within the scope of this invention to provide the timing pulses from pick-up coils such as 50 and 51 located adjacent channels on the magnetic drum which channels will have the synchronizing pulses recorded in them in any suitable manner such as by an oscillator or continuous pulse generator or the like. However, in the exemplary embodiment set forth herein the timing pulses are generated by means of the tooth wheels which are mounted upon the same shaft or at least driven at the same speed as the magnetic drum and usually from the same motor or other driving means. The output of coils 50 and 51 is amplified by the respective amplifiers 60 and 61. Output coil 50 and amplifier 60 are so designed that a high positive output pulse is obtained for each tooth of the gear wheel which passes under the pole-pieces of coil 50. The amplifier 60 contains the necessary pulse forming, pulse shaping means and means for otherwise controlling pulse characteristics as required. In an exemplary embodiment of this invention, pulse output from amplifier 60 for each of the teeth of the gear wheel under coil 50 has a duration of approximately one-tenth the time required for a cell of the magnetic surface of the drum as defined above to pass under a pick-up coil. This pulse duration is not critical and satisfactory results may be obtained with pulses of such a duration.

The output from amplifier 61 comprises a pulse of high negative voltage or polarity for each revolution of the drum or the single tooth wheel. This pulse has a duration which is appreciably greater than the duration of the timing pulses obtained from amplifier 60 but still shorter than the time required for a cell to pass under a recording or pick-up head.

The signals to be recorded will comprise either one or the other of the two different signaling conditions such as voltage or potential conditions across the line resistor, depending upon whether the line is opened or closed as will be described. One of these signaling conditions is called an X signal herein and the other of these signaling conditions is called an O signal. These two different signaling conditions, i. e., X signals and O signals are represented by different currents or voltages or different voltage conditions or different current conditions in different circuits, conductors and terminals in the system. These X signals may also be represented by different magnetic conditions in parts of the equipment. These signaling conditions most frequently comprise a voltage or current of one polarity, i. e., positive or negative, of relatively high, large, or maximum magnitude and a voltage or current of the same polarity but of relatively low or minimum magnitude. When desirable these signaling conditions may be represented by other voltages or currents such as by positive and negative currents or voltages of the same or different magnitudes, or by current and no current, i. e., a current of substantially zero magnitude, or by a voltage and no voltage, etc.

The operation of the system may be better understood and the initial operation of the system improved, if it is assumed that the drum is initially magnetized by applying a substantially continuous current to each of the recording coils of the main recording drum or section and substantially saturating the magnetic material in the drum as it passes between the pole-pieces of each of the recording coils in one of the magnetic conditions caused by one of the two different types of signals or voltage conditions to be recorded in the drum. Thus it is assumed that this voltage will be in the same direction as produced by the so-called O signal when it is desired to record such a signal in the drum. Of course, the opposite or X signal will then comprise magnetizing the drum in the reverse direction between the pole-pieces. In some instances, it is desirable to provide a third type of magnetization which will produce no voltage in the pick-up or reading coil. Such a magnetic condition is readily obtained by orienting an additional coil adjacent to the same channel and rotating the pole-pieces with respect to the channel so that they are 90 degrees displaced from the pole-pieces of the recording coil and the corresponding pick-up coil. Thus an O is recorded in the magnetic material by orienting the so-called magnetic vectors in one direction, which direction causes a voltage of one polarity to be obtained from the pick-up coil or coils when this portion of the drum passes under the pole tips. The recording of an X signal will apply a reverse magnetization to the magnetic material and thus in effect will orient the magnetic vectors in a direction substantially 180 degrees from the first direction and thus cause a voltage of the opposite polarity in the pick-up coil. The erasing or third magnetic condition will cause the magnetic vectors to be rotated at an angle of 90 degrees to the first direction and thus cause no voltage to be induced in the output of the pick-up coil.

When only two magnetic conditions are required then the first or zero condition in general does not cause a voltage to be inducted in the pick-up coil, whereas the opposite magnetic condition representing an X signal causes a voltage of a predetermined polarity and wave shape to be induced in the corresponding pick-up coil. It should be noted that the pick-up coils, recording coils and all of the control equipment therefor together with the electrostatic distributor or scanning mechanism in accordance with this invention are common to all of the lines asssigned to the slots on a given magnetic drum. The various elemental areas on this drum called "cells," however, are individually assigned to different ones of these lines and at all times during the call accurately record the electrical condition and the history of the electrical condition of that line. The cells or slots or elemental areas assigned to a given line are employed for recording the condition of only that line and are never employed to record the condition of any of the other lines individual to the drum.

Considering now the operation of the system and refering more particularly to Fig. 1, two lines 14 and 15 are shown in detail and each is provided with a calling switch such as 10 and 11, respectively, and dials 12 and 13 or other suitable signaling devices. These lines may be of different lengths from short lines to long lines which may extend over considerable distances as in the case of telephone subscribers' lines, annunciator lines, etc. Each line is connected to a ground and a source of electrical energy through resistor elements as shown in the drawing. For example, the upper conductor of line 14 is connected to ground through resistor 16 and the lower conductor connected to battery through resistor 18 and similar resistors 17 and 19 are shown connected to line 15.

So long as the calling switches 10 and 11 remain open the voltage drops across resistors 18 and 19 remain substantially zero with the result that the voltages applied to segments 32 and 33 of the electrostatic distributor remain at substantially battery potential. However, when the contacts 10 close, current flows over line 14 and through resistors 16 and 18 and causes a voltage drop to appear across resistor 18 with the result that a more positive voltage is applied to the distributor segment 32. Consequently, a more positive voltage is induced in the scanning electrode 25 when it passes a segment 32 which more positive voltage is applied to the control grid of the cathode follower 21. In the specific arrangement shown in the drawing the same battery voltage is connected to the shielding segments 30 as is connected to the line circuits, i. e., resistors 18, 19, etc. Consequently as long as the lines are idle no change in voltage is induced upon the rotating member 25.

Substantially the same results may be obtained by connecting the shielding segments 30 to ground and connecting the line segments to resistors 16, 17, etc. In this case the polarity of the output pulse will be reversed from that described herein so amplifier 70 or 71 will include means for reversing the output polarity so a high positive pulse is obtained each time the line is scanned, sampled, or tested when the line is closed and a low pulse when the line is open.

Furthermore, by connecting ground to the shielding segments 30 and the line segments to resistors 18, 19, etc., or by connecting battery to segments 30 and the line segments to resistors 16, 17, etc., pulses of relatively large magnitude of one or the other polarity may be obtained on member 25 when the line is idle and pulses of low or zero magnitude when the line is closed or busy. These pulses will then be inverted in amplifier 70 or 71 in any suitable manner so that a pulse of high positive voltage is obtained on lead 83 when the line is closed and a pulse of low or zero magnitude is obtained on lead 83 when the line is open.

Cathode-follower tube 21 is employed as an impedance-changing device to drive the amplifier 70 and also to apply a voltage to the shield member 26 and the other conductor or shield of the line connecting the amplifier to the stationary ring 24 which voltage is similar to the voltage induced upon arm 25 and applied over the center conductor of line 22 and through the coupling condenser or rings 23 to the grid of tube 21. The application of the output of tube 21 to the screen or shield 22 causes the impedance of the scanning conductor to be raised and causes its equivalent capacity to ground and other elements to be greatly reduced with the result that a greater voltage change is induced in the scanning electrode 25 for a given voltage applied to the scanning line segments 32, 33, etc.

Inasmuch as the pulses output from the scanning arrangement are applied to gate circuits to control the magnetic recording elements as described herein, it is desirable to be able to recognize when the line is open and when it is closed by a suitable change in voltage applied to the scanning electrode. Inasmuch as the various amplifier tubes may change so that the gain is a function of the condition or age of the tubes as well as the voltages applied to these tubes, it is difficult at times to control the circuit so that the different line conditions may be readily recognized.

Furthermore, it is sometimes desirable to change the voltage conditions across the resistor which represents an open line or a closed line. Thus, it may be desirable to change the potential condition of the lines of an office or a group of lines within an office so that increased leakage current does not cause a false indication of a closed line.

In order to overcome the above difficulties a group of regulating circuits including tubes 70, 74 and 78 is provided to control the operation of the system to reduce the effects of leakage current, the battery voltage variation, tube variation, as well as variations in the mechanical scanning arrangement. In accordance with this invention one or more electrodes such as electrode 35 is connected to a voltage dividing circuit comprising resistors 36 and 37 connected to battery 38. Battery 38 usually will be the same battery and applied to the calling lines through resistors 18 and 19. The voltage applied to the segment 35 by the voltage dividers comprising resistors 37 and 38 is so chosen that it represents the dividing point between open and closed lines. If the voltage applied to the other distributor segments such as segments 32 and 33 is more positive than this voltage then the line is tested as being closed whereas if the voltage of these other line segments 32, 33, etc. is less positive or more negative than the voltage of segment 35 then the line is tested as being open. Furthermore, by varying the potential of segment 35 and by varying the voltage divider 37 either by means of taps or by means of a continuously variable resistor element the voltage limit which represents an open or a closed line may be varied from office to office or between lines within a given telephone subscriber's office which lines are individual to any given scanning mechanism.

Assume first for purpose of illustration that the switches 65, 66, 67, 68, 69 and 90 are all positioned as shown in the drawing. When the switches are thus positioned the circuit is conditioned to change the bias on amplifier 70 so that when the scanning segment approaches the line conductor more positive than segment 35 a positive voltage indicating a closed line is applied to conductors 83 and 84 which voltage is employed to control a magnetic condition of predetermined elemental areas on the drum as described herein. As the scanning element 27 approaches a closed line a positive voltage is repeated by the cathode follower tube 21 on conductor 85 which voltage is assumed to be of sufficient magnitude to cause the amplifier tube 70 to repeat the pulse in its output circuit. As shown in the drawing the amplifier 70 comprises a single-stage or single tube amplifier. This tube, however, represents the tubes of a single or multistage amplifier wherein tube 70 may represent either the first, last or intermediate tubes of such an amplifier or a plurality of said tubes. Positive pulses from conductor 85 are repeated through tube 70 and transmitted through switch arm 68 to amplifier 71 which amplifier may further amplify or shape the pulses when desired. Amplifier 71 is also arranged to invert the pulses so that a positive pulse is applied to conductor 83 each time the scanning element 27 passes adjacent segments 32, 33, etc. connected to a closed and busy line. The diode rectifier 72 or other similar device is employed to clamp the output of amplifier 71 so that the ouput of the amplifier does not become negative. In other words, when conductor 83 attempts to be driven negative the rectifier 72 becomes conducting and maintains the voltage of conductor 83 at substantially ground potential. However, when a positive pulse is applied to conductor 83, rectifier 72 presents a high impedance to this positive voltage and thus permits it to be transmitted through the amplifier and applied to conductor 83. The positive voltage thus applied to conductor 83 is employed to actuate the single cycle multivibrator 79 which is arranged to further shape the pulses and time their duration. The single-cycle multivibrator 79 is arranged so that it will be actuated to its operated position for a short interval of time with the application of each positive pulse thereto and then returns to its unactuated condition independently of the positive pulse applied to the multivibrator over conductor 83. The output conductor 84 is connected to a terminal of the multivibrator 79 so that a positive pulse of substantially constant amplitude and fixed duration is applied to conductor 84 in response to each of the pulses received over conductor 83.

The output of the single-cycle multivibrator 79 is connected through switch 90 to the suppressor or other control grid of tube 74. However, tube 74 is arranged so that positive voltage must be applied to both its suppressor grid and its control grid before current flows in the output circuit of this tube. It is to be noted that the cathode of tube 74 is connected to a voltage divider which in turn is connected between ground and the negative source of voltage. Thus, the cathode of this tube is maintained at a substantially negative voltage with respect to ground. It should also be noted that the anode of tube 74 is connected through the load resistor 76 to ground. Consequently, the anode current for tube 74 is supplied by the negative battery through the voltage divider connected to the cathode of this tube, then to the anode and through the load resistor 76 to ground. With switch 67 in the position shown, condenser 75 discharges to ground through the load resistor 76. The upper terminal of condenser 75 is also connected through the switch 69 to the grid of tube 70. Thus, the potential difference across this condenser is employed as the biasing voltage for tube 70.

The control grid of tube 74 is connected through coupling condenser 82 and a diode 80 to the output of amplifier 62. The diode 80 is employed to clamp the output circuit of amplifier 62 through the coupling condenser 82 so that the control grid of tube 74 is maintained at substantially the negative battery voltage potential unless and until a positive pulse is applied from amplifier 62 through the coupling condenser 82. Amplifier 62 is supplied with positive pulses from the pick-up device 52 in accordance with magnetic conditions recorded in the drum at positions corresponding to the time that the pick-up arm 27 passes adjacent the controlling segment 35. If two or more elements 35 are employed for gain control in the manner described herein then a corresponding number of positive pulses is obtained from a corresponding number of elemental areas of the drum which pass under the pick-up head 52. Thus, when the scanning element 27 passes adjacent segment 35 a positive pulse is also applied from a pick-up head 52 to amplifier 62 which amplifier in turn applies a positive pulse to the control grid of tube 74.

Under the assumed conditions with substantially no voltage drop across condenser 75, a positive pulse is applied to conductor 84 each time arm 27 passes segment 35 so anode current will flow through tube 74 for the duration of the output positive pulse from the single-cycle multivibrator 79 with the result that the upper terminal of condenser 75 has its voltage made more negative with respect to ground. Tube 74 operates as a substantially constant current device so that a predetermined quantity of charge is removed from condenser 75 for each of the positive pulses applied to the control grid thereof from conductor 84 each time a positive pulse is applied to the control grid of tube 74 from the pick-up device 52. With only one segment 35 provided for control purposes in accordance with the present invention, a small quantity of charge is removed from condenser 75 on each revolution of the scanning element 27 and the magnetic recording drum.

The upper terminal of condenser 75 is connected through switch arm 69 to the lower end of the grid resistor of amplifier tube 70. Thus, the more negative the upper terminal of this condenser becomes the more negative the bias applied to the control element of this tube becomes. So long as a sufficiently high positive voltage is induced upon the pick-up element 27 as it passes the control segment 35 to cause a positive voltage to be applied to conductor 84 through the various amplifier tubes 21, 70 and 71 and the single-cycle multivibrator 79 the voltage of the upper terminal of condenser 75 becomes more negative. Consequently, the grid bias of either the first, last or an intermediate tube of amplifier 70 also becomes more negative. As a result, after a number of revolutions of the pick-up arm 27 a sufficient negative voltage will be applied to the control grid of one or more tubes of amplifier 70 so that the output pulse from this amplifier in response to the scanning element 27 passing adjacent the control segment

35 will be insufficient to actuate the single-cycle multivibrator 79 with the result that no further charge is removed from the upper terminal of condenser 75 during this revolution of the scanning element and drum. As a result the upper terminal of condenser 75 slowly discharges and becomes slightly more positive due to the current flowing through the resistor 76.

When the voltage of the upper terminal of condenser 75 is sufficiently discharged so that the bias on tube 70 will permit a pulse of sufficient magnitude to be repeated through this tube and amplifier 71 to actuate the multivibrator 79 when the pick-up arm 27 again passes segment 35 an additional negative charge is withdrawn from the upper terminal of condenser 71. The magnitude of the charge withdrawn from the upper terminal of condenser 71 under these circumstances may be adjusted so that it will require several revolutions of the drum before the upper terminal of condenser 75 will again permit a pulse to be transmitted through the single-cycle multivibrator when the pick-up segment 27 passes adjacent the scanning element 35.

Now, if the gain of the amplifier tubes changes, then the bias applied to the grid of tube 70 will change to compensate for the change in the gain of the amplifier tubes. Likewise, if the voltage supplied to these amplifiers changes, the grid bias will change to compensate for the change since the upper terminal of condenser 75 will seek a value such that an equilibrium is obtained between the charge removed from the upper terminal of condenser 75 and the discharge of this condenser through resistor 76.

As the pick-up arm 27 passes adjacent other of the distributor segments which are more positive than segment 35, positive pulses are received or applied to the conductor 84 and in turn applied to a gate circuit 201. Likewise, when the pick-up arm 27 passes adjacent segments which are more negative than segment 35, no positive pulse is applied to the conductor 84 and thus no high positive pulse will be applied to the gate circuit 201.

If it is desired to continuously control the bias applied to tube 270 instead of by means of the abrupt changes when tube 74 conducts as described above, switch 90 will be moved from the contact shown in the drawing to the adjacent contact. Under these circumstances, the suppressor or third control grid of tube 74 is connected to the input circuit to multivibrator 79 instead of to its output circuit. The positive pulses from the pick-up element 27, tube 21, amplifying tube 70 and phase inverter amplifier 71 will be positive on lead 83 which positive pulses are in turn applied to the third control grid of tube 74 in the exemplary embodiment of the invention shown in the drawing. A diode 72 is connected to lead 83 in such a direction that the voltage of lead 83 cannot go appreciably below ground potential. If the lead 83 tends to become negative the diode 72 becomes conducting and maintains lead 83 at substantially ground potential. Thereafter, when a positive pulse is applied to this lead the diode 72 becomes non-conducting and permits the voltage of lead 83 to become positive in accordance with the applied positive pulse. The pulses applied to lead 83 from amplifier 71 will not be of fixed magnitude as the pulses output from the single-cycle multivibrator 79 but will vary in amplitude depending upon the gain of amplifier 71, the gain of amplifier tube 70 and the battery voltages applied to the various amplifiers and other equipment. Consequently, the higher the voltage of a positive pulse on lead 83 the more charge is removed from the upper terminal of condenser 73 and the more charge removed from the upper terminal of condenser 73 the greater the negative bias applied to control the element or grid of tube 70 with the result that the next succeeding pulse as the pick-up element 27 passes segment 35 will be of smaller magnitude. Thus, the magnitude of the pulse on lead 83 as the pick-up arm 27 passes conductor 35 is automatically adjusted so that just sufficient charge is removed from the upper terminal of condenser 75 upon each revolution of the drum to compensate for the leakage current through the anode resistor 76 of tube 74. In this manner the over-all effective gain of the system and the amplitude of the pulses from segment 35 are maintained substantially constant. Consequently, by setting the bias of the single-cycle multivibrator 79 so that it either does or does not repeat a pulse at this voltage level, the system may be operated in substantially the same manner as described above, namely, when any of the segments 32, 33, etc. are more positive than segment 35 a positive pulse is applied to the conductor 84 extending to the recording equipment. When any of the segments such as 32, 33, etc. are more negative than segment 35 no such positive pulse will be applied to conductor 84 extending to the recording equipment. In this manner, the variations in voltage of the various sources applied to the amplifiers, the variation of the gain of the amplifier tubes, etc. are compensated for.

The above-described arrangement also may be employed to readily and accurately change the working limits of the various calling lines such as 14 and 15 under different weather conditions or other circumstances. Thus, during wet weather when the leakage resistance of the lines falls so that open lines may test as closed lines due to leakage resistance the potential of segment 35 can be altered by changing the magnitudes of the resistors 36 and 37 so that the voltage of segment 35 may be made more positive thus requiring more line current to flow in the lines tested as being closed. If the potential of segment 35 is reduced then less line current will be required to flow over the lines for them to test as being closed. Thus, in hot weather when the resistance of the lines goes up it may be desirable to thus again change the potential of segment 35. This potential, of course, may be changed in discrete steps by means of a tap switch or it may be changed substantially constantly by means of a continuously variable potentiometer.

In order to increase the output voltage from the pick-up element 27 it is desired to have the clearance between the end of the pick-up arm 27 and the various segments as small as possible. Under these circumstances, however, small eccentricities in the structure and the mounting of the segments becomes more pronounced. Any eccentricity between the path of the pick-up arm 27 and the inner surfaces of the segments causes a variation in the voltages induced in the pick-up arm 27 as it passes the various segments which variations are repeated through the system. Since the bias level is set only once during each revolution in the exemplary embodiment shown in the drawing the compensating arrangement cannot compensate for variations due to eccentricities. One solution of this problem, of course, is to provide additional segments 35. An additional timing mark for each additional segment is recorded in the drum which is picked up by head 52 and supplied to tube 74 through the amplifier 62 in the manner described above. Under these circumstances, however, the bias will not accurately follow the variations in the signal level due to the eccentricity of the system, instead the bias applied to the control element of the tube 70 will tend to approach an average between the levels picked up when the arm is adjacent the various control segments 35.

Mechanical irregularities such as variations in spacing between the movable rotary member and the fixed or stationary members produce small variations in the output from the distributor. These variations are usually cyclic in nature and of a lower frequency than the frequencies due to the fixed segments and are due to the cyclical or rotary motion of the movable member and frequently the most pronounced of these are variations due to eccentricity between the rotary member and the stator. Other mechanical irregularities in the aligning of these members produce similar types of variations.

When it is desired to more accurately control the operating point of the system and thus to reduce the variations due to the eccentricity, switches 66 and 67 may be actuated to the opposite position from that shown in the drawing. Under these circumstances, the output from tube 21 is also applied to the input of amplifier 77 which amplifier is arranged to have a substantially zero phase shift and to include low-pass filter elements or their equivalent so that this amplifier will respond only to the lowest or fundamental frequency of the scanning arrangement due to the eccentricity between the scanning element and the distributor segments. In other words, this eccentricity causes one cycle per revolution and amplifier 77 is arranged to amplify this frequency but not amplify higher frequencies. The output stage of amplifier 77 may be a cathode follower tube or other output arrangements having a low output impedance. The output of this amplifier is connected in series with condenser 75 and thus causes a small voltage to be added in series with the condenser 75. This added voltage is a function of or proportional to the eccentricity and is employed to compensate for this eccentricity. In other words, when the arm 27 approaches the closest to the pick-up segments the output voltage induced in the element 27 will be a maximum and thus more negative with the result that a more negative voltage is applied in series with the condenser 75, thus reducing the gain of the amplifier tube 70 whereas when the pick-up arm 27 is furthest away from the segments 30, more positive voltage is induced upon this arm and signals of less magnitude also induced thereupon. Consequently, a more positive voltage is applied in series with condenser 75, thus reducing the bias applied to the amplifier tube 60 and causing higher output pulses. In this manner, the eccentricity between the pick-up segment and the distributor segments may be readily compensated for.

It is also possible to use the voltage developed across the condenser 75 to control the gain of an amplifier tube instead of applying this voltage to control a bias or threshold or cut-off point of the tube. When it is desired to employ this voltage to control the gain of the amplifier instead of regulating its cut-off condition, switches 65, 68, and 69 are actuated to the position opposite to that shown in the drawing. Under these circumstances, tube 78 is substituted for tube 70 and the suppressor or third control grid thereof connected to the upper terminal of condenser 75. Tube 78 is of a type similar to the 6AS6 tube so the more negative this potential becomes the less the gain of amplifier tube 78. Thus, the magnitude of the pulses output from this tube is similarly controlled and rendered substantially of the same value. Consequently, when the pick-up segment 27 passes adjacent a segment more positive than segment 35 the output pulses from tube 78 are of sufficient magnitude to actuate the single-cycle multivibrator 79. However, when the pick-up arm 27 passes adjacent segments 32, 33, etc. which are less positive than segment 35 then the voltage pulse output from tube 78 is insufficient when amplified by amplifier 71 to actuate the single-cycle multivibrator 79. The above-described modes of controlling the potential on condenser 75 as well as compensation for eccentricity between the pick-up arm and the distributor segments may be controlled in the manner described above with the result that the various compensations may be effected by controlling the gain of tube 78 instead of controlling the bias as described with reference to tube 70.

The multivibrator 79 may include additional amplifiers and pulse-shaping equipment so that the signals will be in any form suitable for actuating the magnetic recording equipment described herein. Furthermore, the various amplifiers not shown in detail operate in a normal well-understood manner and are arranged to amplify, repeat and shape the pulses applied to them in the usual manner.

Thus each time the collector element 27 passes over a segment individual to a given line the output of amplifier 21 will be positive if the line is closed and more negative if the line is opened. These two conditions are employed to write the X and O signals in the magnetic drum as described herein.

Figure 2:
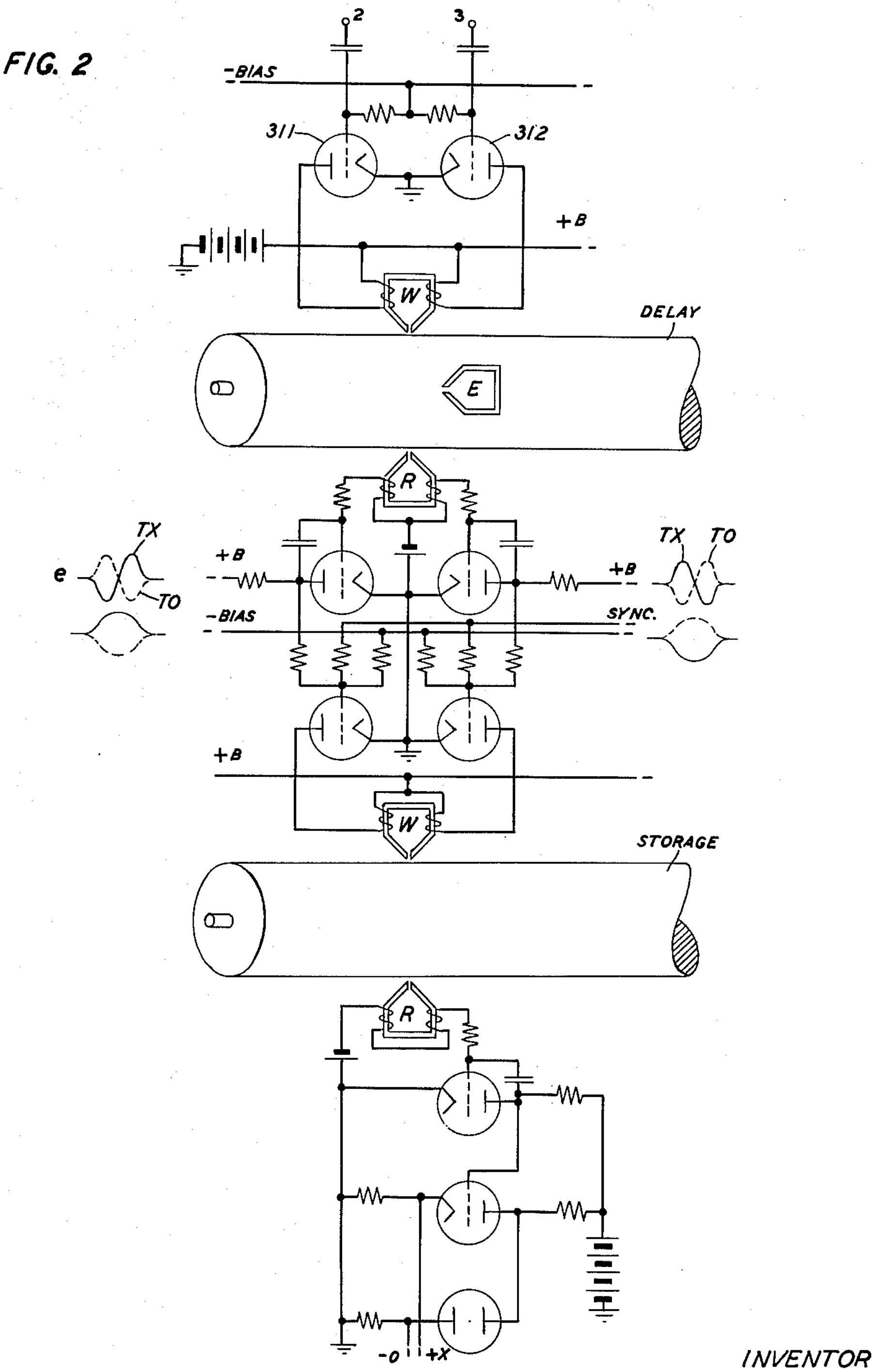
Fig. 2 shows in detail the amplifier circuits required to record and respond to the recorded signals.

For convenience in referring to these directions of magnetization the left-hand coil of head 111, for example, as shown in the drawing is assumed to produce a direction of magnetization in elemental areas of the drum called an X signal while the right-hand coil is assumed to produce a direction of magnetization in the elemental areas of the surface of the drum called an O signal. It is to be understood, however, that the coils that produce the X signal and the coils that produce the O signal may be wound upon both of the pole-pieces of the recording head 111. As shown in the drawing the coils of the recording head 111 are connected to the output circuit of a recording or writing amplifier 110. As shown the amplifier 110 is provided with two input leads, one designated X and the other O. Both of these leads are normally maintained at a relatively low voltage near ground potential by the gate circuit 201. These input leads connect to terminals 2 and 3 of amplifier 110 which are coupled through condensers to the grids of the respective tubes 311 and 312 as shown in Fig. 2. In the exemplary embodiment the input grids of the amplifier tubes 311 and 312 are normally maintained or biased at a negative voltage with respect to ground and as a result no output current flows in the output circuit of amplifier 110 so that under these conditions the magnetic conditions of the surface elements of the drum passing under the pole tips of coil 111 are not changed.

Gate circuits such as G1 comprise a plurality of rectifiers or diodes which may be of the germanium crystal type, or other suitable forms of crystals or combinations of crystals or high vacuum diodes. The gate circuits have an input circuit shown at the bottom of the rectangle such as 201 which is connected to the output of the synchronizing amplifier 60. The gate circuit has input circuits shown at the left-hand side of the rectangle or box 201 which in turn are connected to the rectifiers 206 and 208. This gate circuit also has an input lead shown at the right-hand side of the rectangle in turn connected to the rectifier element 207. Each of the input leads to the gate circuits have either one or the other of two different voltage or current conditions applied to it. In the exemplary system described herein in detail the gate circuits are arranged to have their input circuits or terminals connected to relatively low impedance circuits which will apply either a high positive voltage of say about 75 volts or more to the input terminal or a low positive voltage of say about 25 volts or less thereto.

So long as a low positive voltage is applied to any one or more of the inputs, current flows from battery 200, and from any of the other inputs having a high positive voltage applied to it, through the diode connected to the relatively low positive voltage with the result that the common point which comprises an output from the gate circuit is maintained at or near the voltage of the relatively low voltage applied to that input lead or leads. When the voltage applied to all of the input terminals on the left-hand side is a high positive voltage, the gate circuit is arranged so that it will apply a high positive voltage to the X input lead to amplifier 110 in response to a high positive synchronizing pulse supplied from the synchronizing amplifier 60 to the common point between the diodes 204 and 205, with the result that this change in voltage causes an X signal to be recorded in the corresponding cell or unit area in the surface of the drum passing under the recording coil 111 at this time. Likewise when a high positive voltage is applied to the input lead connected to the diode 207, a high positive voltage is repeated to the O input lead to amplifier 110 when a high positive synchronizing pulse is applied from the synchronizing amplifier 60 to the common point between the diodes 204 and 205 with the result that an O is recorded in the magnetic element of the drum passing under the recording head 111 at this time.

The gate circuits such as G1 shown within the rectangle 201 may be arranged in a plurality of different manners. These gate circuits may be arranged so that a high positive voltage applied to any one of the input leads will cause a high positive voltage to be repeated to the corresponding output lead in response to the application of a synchronizing pulse from the synchronizing lead. Such gate circuits are sometimes called "Or" gate circuits, that is, circuits in which outputs appear in response to a high positive voltage applied to any one or more of the input leads. Alternatively, the gate circuits may be arranged such that a high positive voltage has to be applied to all of the input leads or all of a group of the input leads before a high positive voltage is repeated to the corresponding output lead. Such circuits are frequently called "And" circuits. Such circuits are obtained by applying suitable potentials to the diode elements and properly orienting the diode element. These circuits may also be arranged so that combinations of the two types of circuits may be employed when desired. Furthermore, the voltages applied to these circuits may be such that input voltages so applied to the input leads prevent a high positive output pulse instead of permitting one, as described above.

For example, with respect to the gate circuit G1, it is necessary for a high positive voltage to be applied to the right-hand terminal of the diode 207 to cause an O signal to be recorded by the recording coil 111 in response to a high positive synchronizing pulse from the synchronizing amplifier 60.

With respect to the inputs required to cause the recording coil to record X in the corresponding cell of the magnetic drum, the voltage of both of the input leads on the left-hand side of the gate G1 must be a high positive voltage. However, in the absence of a recorded X signal passing under the pick-up coil 115 at this time the output from the X lead from amplifier 116 is a low positive voltage and the output from the O lead of amplifier 116 is a high positive as will be described hereinafter with the result that a high positive voltage is applied to the diode 206. Consequently, when the voltage of the scanning electrode 25 becomes more positive, a high positive potential is applied to the left-hand terminal of the diode 208 and as a result when the synchronizing pulse from the amplifier 60 is applied to the gate G1, the voltage of the X input lead to amplifier 110 becomes a high positive voltage and causes an X to be recorded in the corresponding cell under the recording head 111 at this time. No high positive voltage is applied to the O input lead to amplifier 110 at this time. Then the arm 25 will move on to the next segment or terminal of the distributor or scanner. In case the next line is also busy or has current flowing over it, an X will be written or recorded in the next cell. Conversely, if the next line has no current flowing in it at this time, an X will not be written or recorded in the succeeding cell because electrode 25 will be sufficiently negative and thus will not cause the application of a high positive voltage to the left-hand terminal of diode 208.

After the above-described X is written in the cell corresponding to line 14, in the manner described above, this cell will pass around the drum and pass under the pick-up coil or reading head 112 and cause an output voltage to be developed in the winding of this head or coil. The output coils from the pick-up head 112 are connected to transfer amplifier 113 which causes the corresponding X to be recorded by the recording head 114 in the cell passing under this recording coil at this time. The X recorded by the recording head 111 then continues around the drum and passes under the erasing head 118. The erasing head comprises a permanent magnet or a continuously energized electromagnet oriented in such direction that the magnetization of the drum after passing under this head produces no output voltage in any of the pick-up coils under which this portion of the drum will pass. During the time the X recorded by the recording head 111 is rotating from the pick-up head 112 to the erasing head 118 and then on to the recording head 111 again, the X recorded by the recording head 114 is also rotated around the drum so that at approximately the same time that the pick-up arm 25 again passes opposite segment 32 connected to line 14 in the manner described above, the X recorded in the cell assigned to line 14 on the drum in the channel associated with head 115 will pass under head 115. As a result the voltage induced in the pick-up head 115 and amplified by amplifier 116 causes a high positive voltage to be applied to the output X lead of amplifier 116 and causes a low positive voltage to be applied over the output O lead from amplifier 116 to the left-hand terminal of diode 206 at this time, so that when this next high positive pulse from the scanning mechanism due to the scanning of line 14 and the next corresponding high positive synchronizing pulse from the amplifier 69 are applied to diodes 208 and 204 and 205, the voltage of the X lead is prevented from becoming positive. Consequently, no further signals will be recorded by the head 111 at this time so no further voltages will be induced in the pick-up head 112 by the cell in the channel under head 111 assigned to line 14. However, the X recorded in the cell in the channel under heads 114 and 115 assigned to line 14 will remain until removed or changed in the manner described hereinafter.

The output voltage from amplifier 21 is also applied to the left-hand input terminal of the gate G2 shown within rectangle 211 in Fig. 1. This gate is in turn connected through an amplifier 120 to a recording head 121 which amplifier and recording head are arranged to write or record only X's upon the corresponding channel of the drum. Thus, each time the synchronizing pulse from the amplifier 60 is applied to the diode 214, a high positive pulse appears on the X lead from gate 211 when positive voltage is also applied to the diode 216 from the scanner amplifier 21. As pointed out above, such a high positive voltage is received from amplifier 21 and thus applied to the diode 216 each time the distributor or scanner arm 25 passing adjacent the segment of a line over which line current is flowing with the result that an X is written in each of the cells in the channel under the recording head 121 assigned to the respective lines having current flowing over them. When these cells pass under the pick-up head 122, they induce voltages therein which are repeated by the repeating or transfer circuit 123 to the recording head 124 which records corresponding X signals in the corresponding cells in this channel assigned to the respective lines.

The succeeding signaling conditions received from the line will be similarly recorded in the magnetic surface of the drum as described in detail in my above-identified copending application Serial No. 185,929, filed September 21, 1950. Likewise, the signals received from other lines are similarly recorded in other element areas of the drum assigned to these other lines, each of the lines being tested in succession and found to be closed when the potential of the segment connected to its battery supply resistor is more positive than the potential applied to segment 35 and each of the lines being tested as open when the potential applied to its segment from the battery supply resistor is more negative or less positive than the potential of the segment 35.

It is to be understood that the above-described arrangements are illustrative of the application of the principles of the invention. Numerous other arrangements may be devised by those skilled in the art without departing from the spirit and scope of the invention.

What is claimed is:

1. In combination, a capacitative commutator comprising a plurality of fixed conductors insulatedly supported from each other, another conductor, means for moving said other conductor into spaced relationship successively with each of said fixed conductors to form an electrical condenser therewith, an amplifier controlled by the voltage induced on said other conductor as it is moved into spaced relationship successively with said first conductors, means for applying a test voltage to one of said fixed conductors and apparatus responsive to the magnitude of an electrical variation induced in said other conductor as it is moved into spaced relationship with said fixed conductor for controlling the magnitude of the output of said amplifier.

2. In combination, a capacitative commutator comprising a plurality of fixed conductors insulatedly supported from each other, another conductor, means for moving said other conductor into spaced relationship successively with each of said fixed conductors to form an electrical condenser therewith, an amplifier controlled by the voltage induced on said other conductor as it is moved into spaced relationship successively with said first conductors, bias means for said amplifier, means for applying a test voltage to one of said fixed conductors and apparatus responsive to the voltage induced in said other conductor as it moves into spaced relationship with said fixed conductor having said test voltage applied thereto for automatically regulating the bias applied to said amplifier by said bias means.

3. In combination, a capacitative commutator comprising a plurality of fixed conductors insulatedly supported from each other, another conductor, means for moving said other conductor into spaced relationship successively with each of said fixed conductors to form an electrical condenser therewith, an amplifier controlled by the voltage induced on said other conductor as it is moved into spaced relationship successively with said first conductors, means for controlling the gain of said amplifier, apparatus for applying a voltage of predetermined polarity and magnitude to one of said fixed conductors, and apparatus responsive to the voltage induced in said other conductor as it passes said one fixed conductor for regulating the gain of said amplifier.

4. In combination, a capacitative commutator comprising a plurality of fixed conductors insulatedly supported from each other, another conductor, means for rotating said other conductor into spaced relationship successively with each of said fixed conductors to form an electrical condenser therewith, an amplifier controlled by the voltage induced on said other conductor as it is rotated into spaced relationship successively with said first conductors, means for controlling the gain of said amplifier, apparatus for applying a voltage of predetermined polarity and magnitude to one of said fixed conductors, apparatus responsive to the voltage induced in said other conductor as it passes said one fixed conductor for regulating the gain of said amplifier, means for deriving a controlling voltage from the voltage of said other conductor which voltage is a function of the eccentricity between said other conductor and said fixed conductors, and apparatus for changing the gain of said amplifier under control of said controlling voltage.

5. In combination, a capacitative commutator comprising a plurality of fixed conductors insulatedly supported from each other, another conductor, means for rotating said other conductor into spaced relationship successively with each of said fixed conductors to form an electrical condenser therewith, an amplifier controlled by the voltage induced on said other conductor as it is rotated into spaced relationship successively with said first conductors, bias means for said amplifier, means for applying a test voltage to one of said fixed conductors, apparatus responsive to the voltage induced in said other conductor as it rotates into spaced relationship with said fixed conductor having said test voltage applied thereto for automatically regulating the bias applied to said amplifier by said bias means, means for deriving an additional voltage from said other conductor which is a function of the eccentricity between said other conductor and said fixed conductors, and apparatus controlled by said additional voltage to further regulate said bias means.

6. In combination, a capacitative commutator comprising a plurality of the fixed conductors insulatively supported from each other, another conductor adapted for movement into spaced relationship successively with each of said fixed conductors to form an electrical condenser therewith, a plurality of electrical signaling lines, means for interconnecting each of said signaling lines with one of said fixed conductors individual thereto to convey voltages from said lines to said fixed conductors individual thereto, other apparatus for applying a reference voltage to one of said fixed conductors, amplifying means connected to said other conductor, an output circuit for said amplifying means, and means responsive to said reference voltage applied to said one fixed conductor for controlling said amplifying means to apply one condition to said output circuit when said other conductor passes a fixed conductor having a more positive voltage applied thereto than said reference voltage applied to said one fixed conductor.

7. In combination, a capacitative commutator comprising a plurality of fixed conductors insulatedly supported from each other, another conductor adapted for movement into spaced relationship successively with each of said fixed conductors to form an electrical condenser therewith, a plurality of electrical signaling lines, means for interconnecting each of said signaling lines with one of said fixed conductors individual thereto, other apparatus for applying a reference voltage to one of said fixed conductors, amplifying means connected to said other conductor, an output circuit for said amplifying means, means responsive to said reference voltage applied to said fixed conductor for controlling said amplifying means to apply one electrical condition to said output circuit when said other conductor passes a fixed conductor more positive than said reference voltage applied to said one fixed conductor and for applying another electrical condition to said output circuit when said other conductor passes adjacent to the fixed conductor of a line which is more negative than said reference voltage applied to said one fixed conductor.

8. In an electrostatic commutator in combination, a reference segment, means for applying a reference voltage condition to said segment, means for deriving an output voltage from said commutator, an amplifier for amplifying voltage derived from said electrostatic commutator, a condenser, and means for changing the charge on said condenser each time the voltage derived from said commutator under control of said reference potential exceeds a predetermined magnitude.

9. In an electrostatic commutator in combination, a reference segment, means for applying a reference voltage condition to said segment, means for deriving a voltage from said commutator, an amplifier for amplifying voltage derived from said electrostatic commutator, a condenser, means for changing the charge on said condenser each time the voltage derived from said commutator under control of said reference potential exceeds a predetermined magnitude, bias means for said amplifier, and means responsive to the voltage on said condenser for controlling said bias means.

10. In an electrostatic commutator having an output circuit in combination, a reference segment, means for applying a reference voltage condition to said segment, an amplifier connected to said output circuit, a condenser, means for changing the charge on said condenser each time the voltage of said output circuit from said commutator in response to said reference voltage exceeds a predetermined magnitude, apparatus for varying the gain of said amplifier, and means controlled by the voltage on said condenser for controlling said apparatus for varying the gain of said amplifier.

11. In combination, a capacitative commutator comprising a plurality of fixed conductors insulatively supported from each other, another conductor adapted for movement into spaced relationship successively with each of said fixed conductors to form an electrical condenser therewith, a plurality of signaling lines, a source of electrical energy interconnected with said lines to supply electrical energy thereto, means for individually interconnecting each of said signaling lines with one of said fixed conductors, apparatus interconnected with said source for deriving a reference voltage under control of said source, means for applying said reference voltage to one of said fixed conductors, amplifying means connected to said other conductor, and apparatus responsive to the voltage induced on said other conductor as it moves into spaced relationship with said one fixed conductor for controlling said amplifying means.

12. In combination, a plurality of signaling lines, a source of electrical energy for supplying electrical power to said signaling lines, scanning apparatus for scanning each of said signaling lines one at a time and in succession comprising a plurality of fixed conductors insulatively supported from each other, means for individually interconnecting each of said signaling lines with one of said fixed conductors, a pick-up device adapted for movement into spaced relationship successively with each of said fixed conductors, apparatus for deriving a reference electrical quantity from said source, means for applying said reference electrical quantity to one of said fixed conductors, amplifying means connected to said pick-up device, biasing means for said amplifying means to provide an input threshold level for said amplifying means, and apparatus controlled by an electrical quantity derived from said pick-up as said pick-up passes said one fixed segment for regulating said biasing means.

13. In combination, a plurality of electrical signaling lines, an electrical scanning mechanism including a plurality of fixed conductors, means for individually interconnecting each of said lines with individual ones of said fixed conductors, a pick-up device adapted for movement into spaced relationship successively with each of said fixed conductors, means for applying a reference electrical condition to one of said fixed conductors, amplifying means connected to said pick-up device, an output circuit for said amplifying means, apparatus responsive to the electrical condition induced in said pick-up device as said pick-up device moves into spaced relationship with said one conductor for jointly controlling the character of the current applied to said output circuit as said pick-up device moves into spaced relationship with said other fixed conductors.

14. In combination, an electrical scanning device comprising a plurality of fixed conductors insulatively supported one from another, a pick-up device adapted for movement into spaced relationship successively with each of said fixed conductors, means for applying a reference electrical condition to one of said conductors, an amplifier connected to said pick-up device, means responsive to said reference electrical condition applied to said one conductor to control said amplifier.

15. In combination, an electrical scanning mechanism including a plurality of fixed conductors, means for applying a plurality of different electrical conditions to an individual one of said fixed conductors, a pick-up device adapted for movement into spaced relationship with each of said fixed conductors, means for applying to one of said fixed conductors a reference electrical condition defining the boundary between a plurality of said conditions applied to said fixed conductors, amplifying means connected to said pick-up device, and apparatus controlled by electrical conditions induced in said pick-up device as said pick-up device moves into spaced relationship with said one fixed conductor to control said amplifying means.

16. In combination, a capacitative commutator comprising a plurality of fixed conductors insulatedly supported from each other, another conductor, means for moving said other conductor into spaced relationship successively with each of said fixed conductors to form an electrical condenser therewith, an amplifier controlled by the voltage induced on said other conductor as it is rotated into spaced relationship successively with said fixed conductors, means for controlling the gain of said amplifier, apparatus for applying a voltage of predetermined polarity and magnitude to one of said fixed conductors, apparatus responsive to the voltage induced in said other conductor as it passes said one fixed conductor for regulating the gain of said amplifier, means for deriving a controlling voltage from voltage induced on said other conductor which voltage is a function of the mechanical irregularities in spacing between said fixed conductors and between said fixed conductors and said other conductor, and apparatus for changing the gain of said amplifier under control of said controlling voltage.

17. In combination, a commutator mechanism comprising a plurality of fixed conductors insulatedly supported from each other, a pick-up device, means for rotating said pick-up device into spaced relationship successively with each of said fixed conductors, an amplifier controlled by the voltage induced in said pick-up device, means for controlling the gain of said amplifier, means for applying an electrical potential of predetermined voltage and polarity to one of said fixed conductors, and apparatus responsive to the voltage induced in said pick-up device as it passes said one fixed conductor for regulating the gain of said amplifier.

18. In an electrostatic commutator in combination, a movable element, an output circuit connected to said movable element, a reference segment, means for applying a reference voltage to said reference segment, an amplifier connected to said output circuit for amplifying the voltage derived from said electrostatic commutator, bias means for said amplifier, a condenser, a source of reference energy, control means interconnected with said source and said amplifier for changing the charge on said condenser each time said pick-up device passes said reference segment under joint control of said reference source and the output of said amplifier, and bias means for said amplifier means responsive to the voltage of said condenser for controlling said bias means.

19. In an electrostatic commutator in combination, an output circuit supplied with electrical variations from said electrostatic commutator, a reference segment, means for applying the reference electrical condition to said reference segment, an amplifier for amplifying the output from said commutator, bias means for said amplifier, a reference voltage source, and means jointly controlled by a reference voltage and the output of said amplifier when said pick-up device passes said reference segment for controlling the bias means.

No references cited.